Jan. 29, 1952  F. A. SCHWERTZ  2,583,601
DIFFUSION
Filed May 7, 1947
2 SHEETS—SHEET 1

Inventor
FREDERICK A. SCHWERTZ
By Edmund W Borden
his Attorney

INVENTOR.
FREDERICK A. SCHWERTZ.
BY
his ATTORNEY.

Patented Jan. 29, 1952

2,583,601

UNITED STATES PATENT OFFICE 2,583,601

DIFFUSION

Frederick Anton Schwertz, Pittsburgh, Pa., assignor to Koppers Company, Inc., Pittsburgh, Pa., a corporation of Delaware Application May 7, 1947, Serial No. 746,593

12 Claims. (Cl. 183—115)

This invention relates to diffusion. More particularly the invention relates to the separation of the components of an azeotropic mixture by the aid of diffusion.

An azeotrope is a combination of two or more compounds which form a mixture that has a constant boiling point. Such a mixture may not be separated by ordinary distillation. Azeotropic mixtures have been separated by azeotropic distillation but this operation requires the use of one or more solvents to make other azeotropic mixtures that permit separation of the components. Thereafter it is necessary to separate the solvents from the components by distillation or other means. Such methods are often quite complex and expensive.

The primary object of the present invention is to provide a method of separating azeotropic mixtures by diffusion. Another object of the invention is to provide a method of separating azeotropic mixtures by a combination of diffusion and distillation.

A further object of the invention is to provide a method by which a substantial amount of one component of an azeotropic mixture may be separated from the other component and the remaining azeotropic mixture repeatedly returned for diffusion treatment, to obtain a substantially complete separation of the azeotropic mixture.

The relative rate at which the components of a vapor mixture will pass through a diffusion boundary depends upon the relative diameters and the masses of the molecules comprising both the azeotrope to be separated and the sweep medium employed in the diffusion. I have found that the vapor components of an azeotropic mixture condense at different rates in the diffusion zone, and, therefore, by maintaining definite condensing temperatures in the diffusion zone, the difference in diffusion rate and the difference in condensing rate are additive in effecting a total and rapid separation of the components of an azeotropic mixture.

Accordingly another object of the invention is to provide a method of separating azeotropic mixtures by diffusion which is assisted by condensation in the diffusion zone.

A further object of the invention is to provide a method of separating azeotropic mixtures by a combined and simultaneous diffusion and condensation and distillation of the products recovered from the diffusion separation.

With these and other objects in view the invention consists in the method of separating azeotropic mixtures by diffusion as hereinafter described and particularly defined in the claims.

Figure 1:
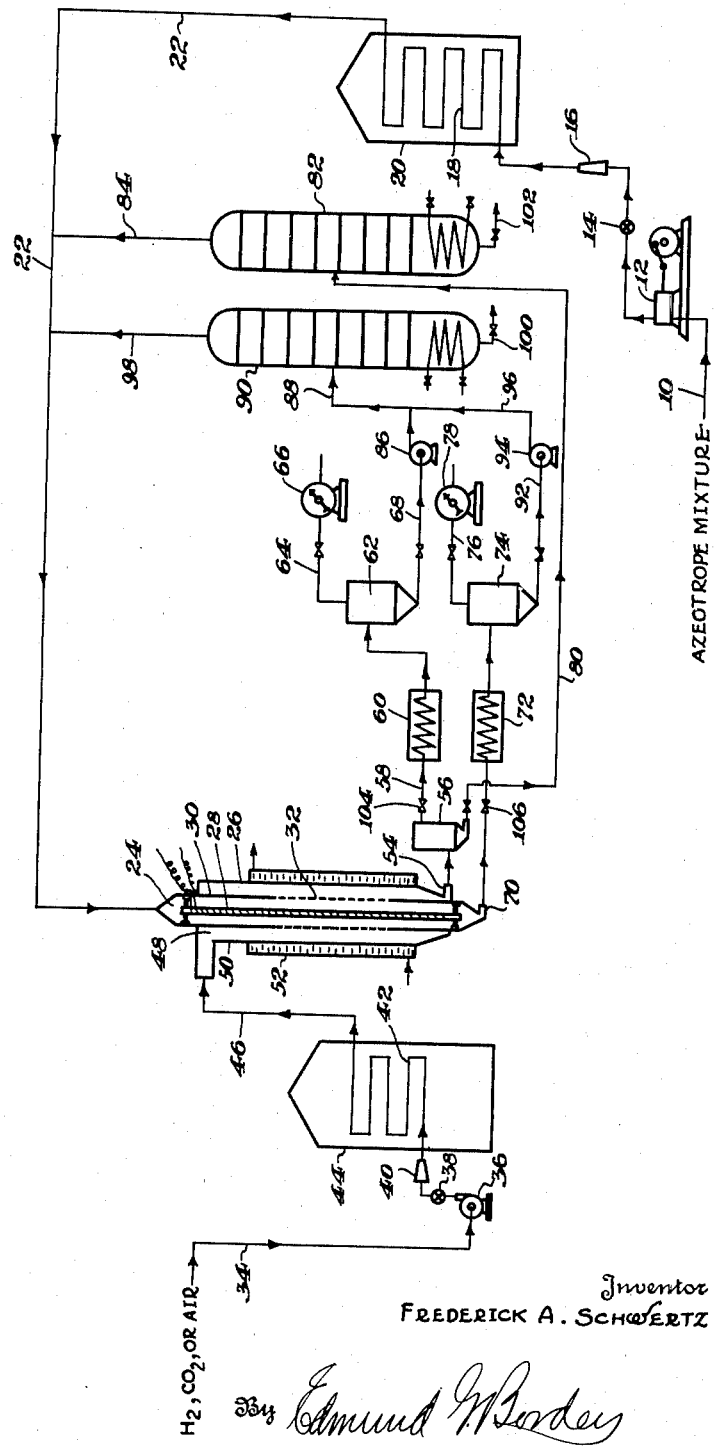
Figure 2:
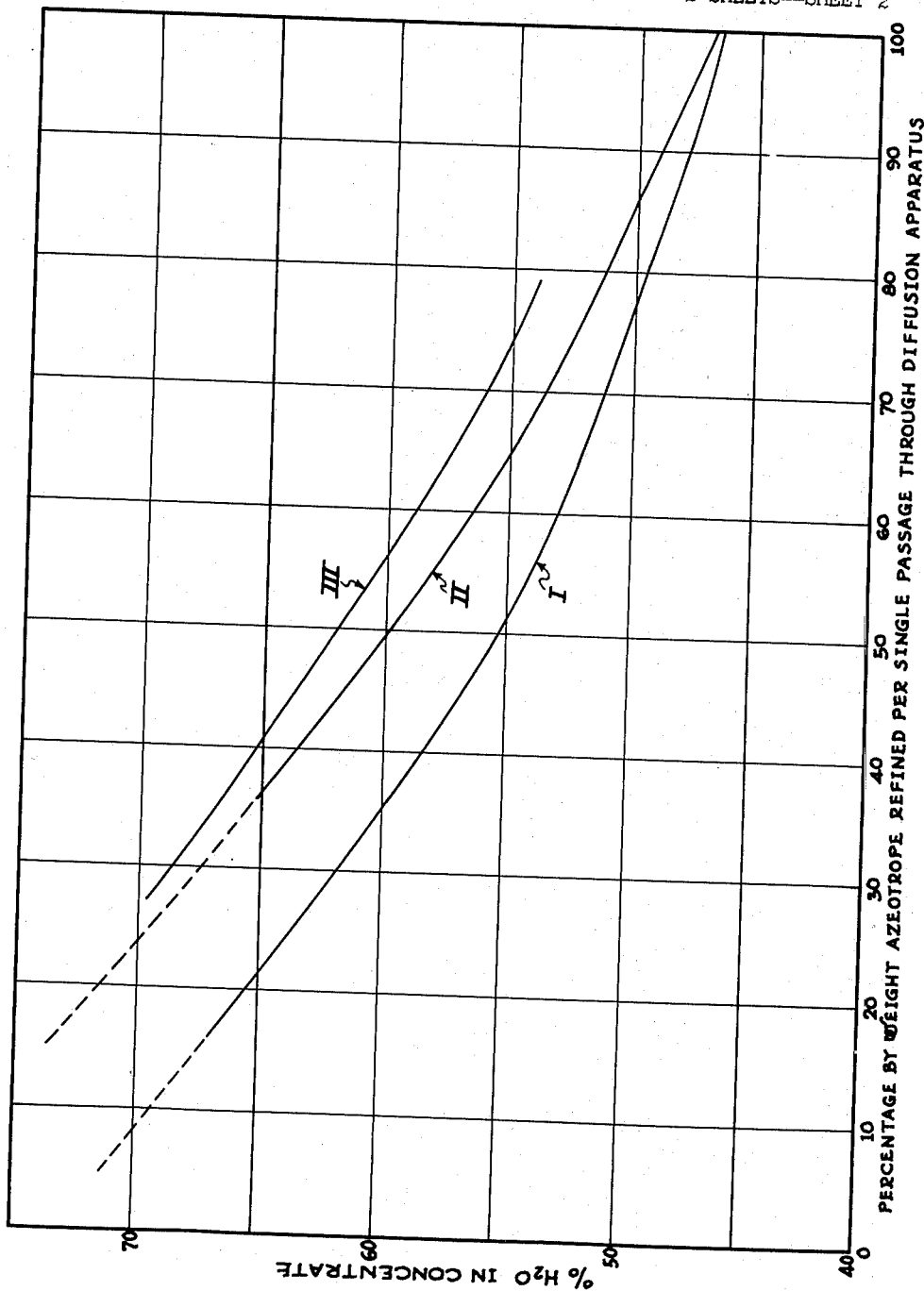

The various features of the invention are illustrated in the accompanying drawings in which Figure 1 is a diagrammatic flow sheet of an apparatus in which the preferred method of separation of azeotropic mixtures may be carried out; and Figure 2 are curves illustrating the separation of pyridine-water azeotrope by various diffusion methods.

To effect the separation of an azeotropic mixture of vapors or vaporizable liquids with diffusion it is important to select a noncondensible sweeping medium to carry out the method. The type of sweeping medium is also important because it affects both the rate and selectivity of the diffusion process. Both the rate and selectivity of separation by diffusion depend on the diameters and masses of the molecules comprising both the azeotrope to be separated and the sweeping medium.

The diffusion coefficient for the movement of the vapors through a porous boundary to the sweep gas side of the boundary may be expressed by the following equation:

(A) $\quad D_{13} = k(P, T)\left(\frac{1}{d_1+d_3}\right)^2\left(\frac{1}{m_1}+\frac{1}{m_3}\right)^{\frac{1}{2}}$ The diffusion coefficient for the movement of the sweep gas through the porous boundary to the vapor side of the boundary may be expressed by the following equation:

(B) $\quad D_{23} = k(P, T)\left(\frac{1}{d_2+d_3}\right)^2\left(\frac{1}{m_2}+\frac{1}{m_3}\right)^{\frac{1}{2}}$ In these equations $k(P,T)$ means that the $k$ is a constant depending upon the temperature and the pressure at which the diffusion is carried out. $d_1$ and $d_2$ represent the diameters of the molecules comprising the azeotrope and $d_3$ represents the diameters of the molecules of the sweeping medium. $m_1$, $m_2$ and $m_3$ represent respectively the corresponding molecular mass of the components of the azeotrope and the sweeping medium.

To secure high selectivity it is necessary that the ratio of the two above equations be as large as possible, which may be expressed by the equation:

(C) $\quad \frac{D_{13}}{D_{23}} = \left(\frac{d_2+d_3}{d_1+d_3}\right)^2\left[\left(\frac{1}{m_1}+\frac{1}{m_3}\right)\Big/\left(\frac{1}{m_2}+\frac{1}{m_3}\right)\right]^{\frac{1}{2}}$ An algebraic rearrangement of the Equation C may be expressed by equation:

(D) $\quad \frac{D_{13}}{D_{23}} = \left(\frac{m_2}{m_1}\right)^{\frac{1}{2}}\left(1+\frac{d_2-d_1}{d_1+d_3}\right)^2\left(1-\frac{m_2-m_1}{m_2+m_3}\right)^{\frac{1}{2}}$ From Equation D it will be obvious that the greatest selectivity is obtained when $d_3$ is as small as possible and $m_3$ is as large as possible, that is, a molecule having simultaneously as small a diameter as possible and as large a mass as possible will produce the greatest selectivity. The requirement that the mass be large means that the rate of diffusion will be correspondingly small.

In Table I are indicated variations of the rate and selectivity of the diffusion process for the separation of water from pyridine where hydrogen, air and mercury vapor respectively are used as the sweeping medium.

TABLE I

*Relative diffusion rates and selectivities*

| Sweeping Medium | Relative Rate of Diffusion of Water Vapor into Different Media. Rate of Diffusion into H₂ Taken as Unity | Relative Rate of Diffusion of Pyridine into Different Media. Rate of Diffusion into H₂ Taken as Unity | Relative Rate of Diffusion of Water Vapor and Pyridine into Different Media |
|---|---|---|---|
| Hydrogen | 1.00 | 1.00 | 2.34 |
| Air | 0.28 | 0.24 | 2.72 |
| Mercury | 0.22 | 0.14 | 3.69 |

In Table I the rate of diffusion of water vapor into air and mercury is compared with the rate of diffusion of water vapor into hydrogen which is taken as unity. Similarly, the rate of diffusion of pyridine into air and mercury is compared with the rate of diffusion of pyridine into hydrogen which is taken as unity. The last column gives the relative rate of diffusion of water and pyridine into the three mentioned sweep media. From Table I it will be noted that water vapor and pyridine diffuse into mercury only 22% and 14%, respectively, as fast as they diffuse into hydrogen. However, water vapor diffuses into hydrogen only 2.34 times as fast as pyridine does, but water vapor diffuses into mercury 3.69 times as fast as pyridine does. In summary, the diffusion process goes fastest when hydrogen is used as the sweeping medium, but its selectivity is greatest when mercury is used as the sweeping medium. From a practical standpoint air is probably the most practical sweeping medium.

From a theoretical standpoint, as expressed by Graham's Law of Diffusion, water should diffuse into hydrogen only 2.1 times as fast as pyridine, whereas from practical tests we find that water diffuses into hydrogen 2.34 times as fast as pyridine.

The preferred method of separation of azeotropic vapor and liquid mixtures may be carried out in the apparatus illustrated in Figure 1 as follows:

A liquid azeotropic mixture is drawn through a line 10 into a pump 12 and is forced through a flow regulator 14 and meter 16 into a heated coil 18 mounted in a heating furnace 20. From the furnace 20 the vaporized azeotropic mixture flows through a line 22 into a vapor zone 24 of a diffusion apparatus 26. The vapor zone of the diffusion apparatus is maintained at a temperature of approximately 140° C. either by the superheating of the azeotropic vapor in the furnace 20 or by means of a central heating core 28 mounted within the vapor zone. The heating core 28 is preferably heated by electrical resistance wires. The vapor zone 24 is bounded by a cylindrical wall 30 the midportion of which is a porous diffusion diaphragm or boundary 32. As the vapor mixture flows down through the vapor zone 24 across the boundary 32 the various constituents of the azeotropic mixture act to diffuse through the boundary in accordance with the diameter and mass of the molecules of the constituents.

Simultaneously with the introduction of the vapors of the azeotropic mixture, a substantially uniform composition non-condensable sweep gas, such as air, is introduced through a line 34 to a blower 36 and is forced through a flow regulator 38 and meter 40 into a coil 42 located within a furnace 44 where the sweep gas may be heated if desired. Since the sweep medium is generally cooled in the diffusion apparatus, in most cases it is not desirable to preheat the sweep medium. The air acts as a sweep medium in the diffusion process and is forced through a line 46 into the top of a sweeping zone 48 of the diffusion apparatus. The sweep zone is an annulus which is located between the walls 30 and 32 and an outer wall 50. This zone is comparatively narrow in order to bring all parts of the sweep gas into close contact with the porous diaphragm 32.

In carrying out the preferred method of the process the sweep zone in the area defined by the porous diaphragm 32 is cooled to carry on condensation by means of a cooling fluid positioned within a jacket 52 which surrounds the wall 50.

As the azeotrope vapors pass across the face of the porous diaphragm 32 the constituent of the azeotrope having the smallest molecular mass and diameter will diffuse through the diaphragm more rapidly than the constituent having a larger molecular mass and diameter. As the azeotropic constituents pass from the vapor zone into the sweep gas zone they are chilled by the cold wall and condense within the sweep zone 48 or the zone defined by the porous boundary 32. Condensate formed in the zone 48 flows to the bottom of the zone and together with the sweep medium and uncondensed vapors passes through an outlet 54 into a separator 56. Uncondensed vapors and sweep gas pass from the separator 56 through a line 58 into a condenser 60 where the remaining condensable vapor is condensed and passes into a separator 62. The fixed sweep gas leaves the top of the separator 62 through a line 64 and is measured by means of a meter 66. The condensate from the condenser 60 leaves the bottom of the separator 62 through a line 68.

The residual azeotropic mixture of vapors that does not diffuse through the boundary 32, together with the fixed gas which diffuses through the boundary, passes out of the bottom of the vapor zone 24 through an outlet 70 and passes into a condenser 72 to condense the vapors in the mixture. The condensate collects in a separator 74 and the fixed sweep gas passes out of the top of the separator through a line 76 and is measured by a meter 78.

If hydrogen, carbon monoxide or some valuable gas is used as a sweep medium it is desirable that the gas passing through the meters 66 and 78 should be returned to the line 34 to be recycled through the process. Furthermore, when air is used as a sweep medium it may entrain a substantial amount of vapors. Therefore the air passing through the meters 66 and 78 should be returned to the line 34 to be recycled through the process.

The present process is well adapted for the separation of azeotropes in which one constituent is water and the other constituent is a substance which forms an azeotrope with water, such as aliphatic alcohols, ethanol and isopropanol. Many organic compounds such as pyridine, pyrazine, and the alkylchlorhydrins and glycols, form water azeotropes which may be readily separated by diffusion with the present process. When the vapors of this type of azeotrope diffuse through the porous diaphragm the water condenses at a different rate than the heavier molecule of the alcohol, glycol, acid and the like, and therefore the water may be separated from the azeotrope. Furthermore, I have found that in the diffusion zone the rate of condensation of water is more rapid than the rate of condensation of the alcohols, chlorhydrins, amines and the like, and therefore a selective separation may be carried out by condensing relatively more water than other constituents within the diffusion zone, and at the same time permitting the other constituent of the azeotrope which diffuses through the boundary to pass out of the sweep gas side of the diffusion zone as a vapor. For example, in the apparatus illustrated in Figure 1, the water may be condensed within the diffusion zone and collected in the receiver 56. Whereas a constituent such as pyridine will pass with the air to the condenser 60 to be condensed and collected in the receiver 62. Therefore, the temperature of the cooling liquid in the jacket 52 may be controlled to assist in making a separation of an azeotropic mixture which is additive to the diffusion effect in separating the azeotrope.

As an example, an azeotrope made with water and pyridine has been found to consist approximately of 47% water and 53% pyridine. If this azeotropic mixture is passed through the diffusion apparatus illustrated in Figure 1 at the rate of three volumes of air per volume of azeotrope vapor it is found that approximately 60% of the azeotropic vapor or feed gas mixture will diffuse from the vapor or feed gas side to the air or sweep gas side of the boundary, and that 40% of the air or sweep gas will pass through the boundary to the vapor or feed gas zone. The condensate collected in the receiver 56, that is the condensate formed in the diffusion zone 48, will be composed of approximately 59% water and 41% pyridine, while the condensate from vapors passing through the vapor zone and collected in the receiver 74, that is the condensate from the residual feed gas, will be composed of approximately 29% water and 71% pyridine. In accordance with the amount of water or pyridine in each of these condensates a predetermined amount of azeotrope will be present in each of the condensates. If these condensates are distilled the azeotrope will go overhead as a vapor, and substantially pure water in one case, and pyridine in the other case, will be separated from the condensates.

Since the feed gas mixture contains approximately 47% water and 53% pyridine, and as the condensate from the residual feed gas contains approximately 29% water and 71% pyridine, it is clear that more water than pyridine has been separated from the feed gas by diffusion.

The condensate collected in the chamber 48, that is on the sweep gas side of the diffusion barrier, contains approximately 59% water and 41% pyridine. However, the condensate resulting from condensation of the vapors discharged with the sweep gas has substantially the same composition as the condensate from the residual feed gas, namely 29% water and 71% pyridine. It is clear, therefore, that much more water than pyridine condenses in the diffusion zone. The condensate from the diffusion zone has an excess of water while the condensate from vapors discharged with the sweep gas has an excess of pyridine. Obviously, if the two condensates were mixed, the excess water of one, and the excess pyridine of the other, would combine to form additional azeotropic mixture. However, in this process these condensates are kept separate, and are separately distilled so the excess component is separated from each condensate and the remaining azeotropic mixture is kept at the minimum and the total separation of the azeotropic mixture is at the maximum.

The separation of the pure constituents of the azeotropes by distillation may be carried out in the apparatus shown in Figure 1 as follows:

The condensate collected in receiver 56, that is the condensate formed in the diffusion zone 48, is passed through a line 80 into the mid portion of a bubble cap distillation tower 82 wherein the constant boiling mixture azeotrope is fractionated and passes overhead through the still from a line 84 into the line 22 which leads to the diffusion apparatus. In a continuous process the azeotrope separated in the distillation tower 82 is added to the azeotrope being vaporized in the coil 18 and flowing to the diffusion apparatus.

In some cases it has been found that the amount of water in the condensate which passes through the condenser 60, that is the condensate formed from the uncondensate vapors discharged with the sweep gas, when refining a pyridine-water azeotrope, has been close to the amount of water in the condensate derived from the vapors which pass directly through the vapor zone of the diffusion apparatus and are collected in the receiver 74, that is the condensate formed from the residual feed gas. Therefore, in practice it has been desirable to mix the condensates collected in the receivers 62 and 74 for distillation. The condensate from the receiver 62 passes through the line 68 to a pump 86 and is forced through the line 88 into the mid portion of a bubble cap distillation tower 90. The condensate from receiver 74 flows through a line 92 to a pump 94 and is forced through a line 96 into a line which enters the mid portion of the tower 90. In the tower 90 the constant boiling mixture of pyridine and water flows overhead through a line 98 and enters the line 22 through which the azeotrope vapors pass to the diffusion apparatus. From the bottom of the tower 90, is removed a substantially pure pyridine through a line 100. From the bottom of the tower 82, a substantially pure solution of water is removed through a line 102. Each of the towers 82 and 90 is provided with heating coils in the bottom thereof to assist in the distillation. The distillation in these towers is comparatively simple and does not require much refluxing. Furthermore, the vapors passing overhead are conducted in a vapor state to the vapor line 22 to avoid the necessity of revaporizing these materials in passing through the diffusion zone.

When treating a pyridine-water azeotrope of the above example, wherein 60% by weight of the azeotrope diffuses through the boundary in the apparatus illustrated in Figure 1 as described above, it is found that approximately 13.6% of water and 15.3% of pyridine are separated as pure products from the azeotropic mixture for each passage of the azeotrope through the diffusion apparatus. Therefore, it will require that the azeotrope be recycled about three and a half times through the diffusion apparatus before the constitutents of the azeotrope are completely separated by a continuous process.

In Figure 2 are curves illustrating the separation of the constituents of a pyridine-water azeotrope by the method and apparatus described above. In these curves the ordinates show the amount of water in the concentrate or refined azeotrope separated, and the abscissae show the percentage by weight of azeotrope which is refined in a single passage through the diffusion apparatus. It will be understood that the amount of diffusion refining of the azeotrope may be controlled by means of valve 104 in line 58 and valve 106 in line 70 to control the pressures of the gas and vapors on opposite sides of the diaphragm. Therefore, the rate of flow of the vapors and gas may be controlled to diffuse any desired volume of the azeotrope through the diaphragm. The lower Curve I represents the amount of diffusion which takes place with a conventional type of apparatus wherein the temperature on each side of the porous boundary is maintained by the heating coil 28 and the liquid in the jacket 52 so that no vapors will be condensed within the diffusion zone and all condensation will take place in the condensers 60 and 72.

The Curve II shows the composition of the fractional portions of refined azeotrope when operating the apparatus as illustrated and described in Figure 1 for a single passage of the azeotrope through the diffusion apparatus and without distilling the condensates to separate the unseparated azeotrope from the pure products. Curve II shows the analysis of the product obtained by analyzing the condensates collected in the receivers 74 and 62 when combined.

The Curve III shows the composition of the condensate which is collected in the receiver 56.

It will be understood that if the three condensates which are collected in the receivers 56, 62 and 74 have substantial differences in composition they may be separately distilled to recover the pure constituents. If so desired a separate still may be used for refining the condensate collected in each of receivers 52, 62 and 74.

From the above description it will be seen that the diffusion separation is an effective means by which the equilibrium of a constant boiling azeotrope may be broken to effectively separate one of the constituents from the other constituent of an azeotrope. After the equilibrium has been broken, then the constituents may be separated readily by distillation or simple boiling and with this means a separation of the constituents of the azeotrope may be easily and effectively carried out.

The preferred form of the invention having been thus described what is claimed as new is:

1. A method of separating azeotropic mixtures comprising: passing a fixed sweep gas along one side of a porous diffusion boundary, passing the vapor of an azeotrope along the opposite side of the boundary, maintaining the temperature on the sweep gas side of the boundary sufficiently low to condense vapor of said azeotrope in the vicinity of the boundary, maintaining a temperature on the vapor side of the boundary sufficiently high to prevent condensation of vapor of the azeotrope in the vicinity of the boundary, and separately condensing vapors of said azeotrope in the gas streams leaving each side of the boundary.

2. The method defined in claim 1 in which the fixed gas is air which has a substantially uniform composition at room temperatures.

3. The method defined in claim 1 in which the azeotrope is a mixture of alcohol and water and the sweep gas is air.

4. The method defined in claim 1 in which one component of the azeotrope mixture is water wherein the water diffusing through the boundary is condensed in the diffusion zone while another component of the azeotrope which diffuses through the boundary is condensed outside of the diffusion zone and is collected separately from the water.

5. The method defined in claim 1 in which the vapor of the azeotrope diffusing through the boundary to the sweep gas side thereof is collected, the azeotrope therein is separated from the other component and the azeotrope again passed along the boundary, the diffusion treatment and separation of the azeotrope from the other component being repeated a plurality of times to substantially completely separate the components of the azeotrope.

6. The method defined in claim 1 in which the components of the azeotropic mixture have different condensing temperatures and wherein a temperature is maintained in the diffusion zone on the sweep gas side of the boundary to condense the component diffusing through the boundary which condenses at the higher temperature, and passing sweep gas with the lowest temperature condensing component outside of the diffusion zone to condense it, and separately collecting the condensates.

7. The method defined in claim 1 in which the condensates separately collected are distilled to recover azeotrope vapors therein and the vapors are then passed through the diffusion zone for diffusion into said gas zone a plurality of times to effect the degree of separation desired.

8. A method of separating azeotropic mixtures comprising: passing a fixed sweep gas along one side of a porous diffusion boundary, passing azeotropic vapors along the opposite side of the boundary, maintaining a temperature on the sweep gas side of the boundary sufficiently low to condense the highest boiling component of the azeotrope in the sweep gas portion of the diffusion zone, separately collecting said condensate, passing the sweep gas and uncondensed material through a condenser to condense components of the azeotrope therein, maintaining a temperature on the vapor side of the boundary to prevent condensation of the azeotropic vapors within the diffusion zone, condensing vapors that pass through the diffusion zone on the vapor side of the boundary, adding the condensate from the vapor side of the boundary to the condensate separated from the sweep gas passing through the diffusion zone on the sweep gas side of the boundary, separately distilling the condensate condensed in the diffusion zone and the said condensate mixture to recover vapors of the azeotrope, and returning the vapors from each distillation to the diffusion zone.

9. The method defined in claim 8 in which the azeotropic mixture is pyridine and water and the azeotropic mixture from the distillation step is circulated less than four times through the diffusion zone to completely separate water from pyridine.

10. A method of separating azeotropic mixtures comprising: passing a fixed sweep gas along one side of a porous diffusion boundary, passing azeotropic vapors along the opposite side of the boundary, maintaining a temperature on the sweep gas side of the boundary sufficiently low to condense the highest boiling component of the azeotrope in the diffusion zone, separately collecting said condensate, passing the sweep gas and uncondensed material from the sweep gas side of the boundary through a condenser to condense vapors with azeotrope therein, maintaining a temperature on the vapor side of the boundary to prevent condensation of the azeotropic vapors within the diffusion zone, condensing vapors that pass through the diffusion zone on the vapor side of the boundary, adding the condensate from the vapor side of the boundary to the condensate separated from the gas passing through the diffusion zone on the gas side of the boundary, separately distilling the condensate condensed in the diffusion zone and the said condensate mixture to recover vapors of the azeotrope, returning the vapors from each distillation to the diffusion zone, and recovering a substantially pure component of the azeotrope from each of the distillation steps of the process.

11. In a method of separating the components of an azeotropic mixture, the steps of passing the vapors of an azeotropic mixture across the face of a porous diffusion boundary through a zone maintained at a temperature above that at which condensation of said vapors occurs, passing a fixed sweep gas across the other face of said porous diffusion boundary and through a zone maintained at a temperature low enough to condense a substantial portion of the vapors of said azeotropic mixture passing through said boundary, removing the condensate formed in said condensing zone, distilling said condensate to separate the azeotropic mixture present therein, cooling the gases discharged from said higher temperature zone to thereby condense the vapors of said azeotropic mixture present therein, cooling the gases discharged from said condensing zone to thereby condense the vapors of said azeotropic mixture present therein, and distilling the condensates derived from the gases to thereby separate the azeotropic mixture present therein.

12. In a method of separating the components of an azeotropic mixture of water and pyridine, the steps of passing the vapors of said azeotropic mixture across one face of a porous diffusion boundary through a zone maintained at a temperature above that at which condensation of said vapors occurs, passing a fixed sweep gas across the other face of said porous diffusion boundary through a zone maintained at a temperature low enough to condense a substantial portion of the vapors of said azeotropic mixture passing through said boundary to thereby form in said lower temperature zone a condensate having a substantially larger proportion of water than said azeotropic mixture, removing the condensate from said second passage, distilling said condensate to separate the azeotropic mixture from the water present therein, cooling the gases discharged from said higher temperature zone to thereby condense the vapors of said azeotropic mixture present therein, cooling the gases discharged from said lower temperature zone to thereby condense the vapors of said azeotropic mixture present therein, and distilling the condensates derived from the gases discharged from said passages to separate the azeotropic mixture from the pyridine present therein.

FREDERICK ANTON SCHWERTZ.

REFERENCES CITED

The following references are of record in the file of this patent:

UNITED STATES PATENTS

| Number | Name | Date |
|---|---|---|
| 1,496,757 | Lewis et al. | June 3, 1924 |
| 1,881,490 | Gmelin et al. | Oct. 11, 1932 |
| 2,255,069 | Maier | Sept. 9, 1941 |

FOREIGN PATENTS

| Number | Country | Date |
|---|---|---|
| 733,079 | Germany | Mar. 18, 1943 |

OTHER REFERENCES

Journal Amer. Chemical Society, vol. 45, 1923, Mulliken, pp. 1592–1604.

"Physical Methods of Separating Constant-Boiling Mixtures," Sunier et al., Industrial and Engineering Chemistry, vol. 2, No. 1, Jan. 15, 1930, pp. 110–112.